United States Patent [19]

Hawley

[11] 4,108,205

[45] Aug. 22, 1978

[54] VALVE ARRANGEMENT

[75] Inventor: Jack S. Hawley, Berkeley, Calif.

[73] Assignee: Pneumeric Corp., Castro Valley, Calif.

[21] Appl. No.: 772,461

[22] Filed: Feb. 28, 1977

[51] Int. Cl.² ............................................. F16K 11/04
[52] U.S. Cl. .................................. 137/554; 137/559;
137/625.6; 137/625.66; 137/625.5
[58] Field of Search .......... 137/625.6, 625.66, 625.27,
137/554, 553, 625.5; 92/5 R

[56] References Cited

U.S. PATENT DOCUMENTS

| 2,907,345 | 10/1959 | Randall | 137/625.27 X |
|---|---|---|---|
| 3,167,093 | 1/1965 | George | 137/625.27 |
| 3,368,751 | 2/1968 | Merrill | 92/5 R X |
| 3,430,437 | 3/1969 | Saussele | 137/625.27 X |
| 3,749,127 | 7/1973 | Beeken | 137/625.6 |
| 3,774,637 | 11/1973 | Weber | 137/625.6 |
| 3,859,619 | 1/1975 | Ishihara | 137/554 X |
| 3,861,642 | 1/1975 | Maddocks | 251/61.1 |

Primary Examiner—Alan Cohan
Attorney, Agent, or Firm—Kurt A. Tauchen

[57] ABSTRACT

A valve arrangement for amplifying the effect of the application or removal of atmospheric pressure upon a fluid pressure responsive actuator element such as a pneumatic cylinder or bellows comprising superposed chambers one connected to the atmosphere and the other to a source of vacuum and intermediately of them a chamber connected to the fluid pressure responsive actuator element and forming actually the beginning of a conduit leading to the actuator element. The middle chamber may selectively be set to communicate with one or the other of the two outer chambers through aligned openings in the walls that separate these chambers from the middle chamber and that may alternately be closed by a common stopper which can be moved to close one or the other of the openings so that either atmospheric air or a vacuum is applied through this middle chamber to the actuator element. For this purpose the stopper is mounted on a stem which is connected to a diaphragm that forms the ceiling of the air admission chamber and at the same time the floor of a fourth chamber which is under atmospheric pressure through a pipe leading to the outside atmosphere, but is evacuated when the pipe is closed, by a thin channel leading from the source of vacuum through the stem of the stopper to this fourth chamber.

2 Claims, 3 Drawing Figures

VALVE ARRANGEMENT

BACKGROUND OF THE INVENTION

The present invention relates to pneumatic control valves, i.e. valves that control the inflow of fluid into a pneumatic actuator element, such as a bellows or a pneumatic cylinder to cause it to expand or to permit it to return to its contracted condition. Actuator elements of this type are used for many industrial purposes as precision actuators to move tools or measuring instruments to precise locations. For example such a precision actuator is disclosed in my U.S. Pat. No. 3,913,457.

OBJECTS OF THE INVENTION

Object of the invention is to provide such a pneumatic control valve arrangement that is of simple and inexpensive construction.

Another object of the invention is to provide a pneumatic control valve arrangement that is rapidly and reliably responsive to control manipulations be they automatic or manual.

Still another object of the invention is to provide a control valve arrangement of the type referred to, that is highly sensitive to performance commands, i.e. changes in its operational settings.

Yet another object of the invention is to provide a control valve arrangment for pneumatic cylinders, bellows and the like that amplifies the effect of the application of atmospheric pressure or of the removal of atmospheric pressure upon pneumeric actuation elements.

SUMMARY OF THE INVENTION

In accordance with the invention connection of the interior of a bellows or pneumatic cylinder to a source of vacuum or the atmosphere is controlled by a valve arrangment that has central a chamber which is permanently connected to and is in fact the beginning of a conduit leading to the bellows or cylinder, an outer air admittance chamber that is permanently connected to the atmosphere and another outer chamber that is permanently connected to a source of vacuum. All chambers are superposed and the outer chambers communicate with the centrally located conduit through aligned apertures in their dividing walls that can alternately be closed by a common stopper depending on its position vertically of the chambers. The position of the stopper is controlled by the air pressure condition within a fourth chamber that may be superposed over the air admission chamber. The wall that divides this fourth chamber from the air admission chamber has the form of a diaphragm to which is attached a stem that carries the stopper. This control chamber has a tape perforation sensing pipe that leads to the outside atmosphere. When this pipe is closed, such as by an imperforate portion of a punched program tape, a thin conduit leading from the vacuum chamber through the stem of the stopper to the control chamber evacuates the control chamber rapidly and causes the diaphragm to cave in i.e. arch upwardly which lifts the stopper from a position wherein it blocks communication between the vacuum chamber and the conduit to a position wherein it blocks communication between the conduit and the air admission chamber so that the source of vacuum is now fully applied to the bellows or cylinder. When the pipe leading to the control chamber is unblocked, however, such as when a perforation in the program tape passes over and beyond it, the vacuum in the control chamber is overwhelmed, the diaphragm straightens out and the stopper blocks again communication between the vacuum chamber and the conduit so that the source of vacuum is cut off from the interior of the cylinder and at the same time the opening between the air admittance chamber and the conduit is unblocked permitting air to rush into the interior of the bellows or cylinder causing it to expand. Thus, the effect of blocking and unblocking the pipe leading to the control chamber is amplified.

DETAILED DESCRIPTION OF AN EXAMPLARY EMBODIMENT OF THE INVENTION

Figure 1:
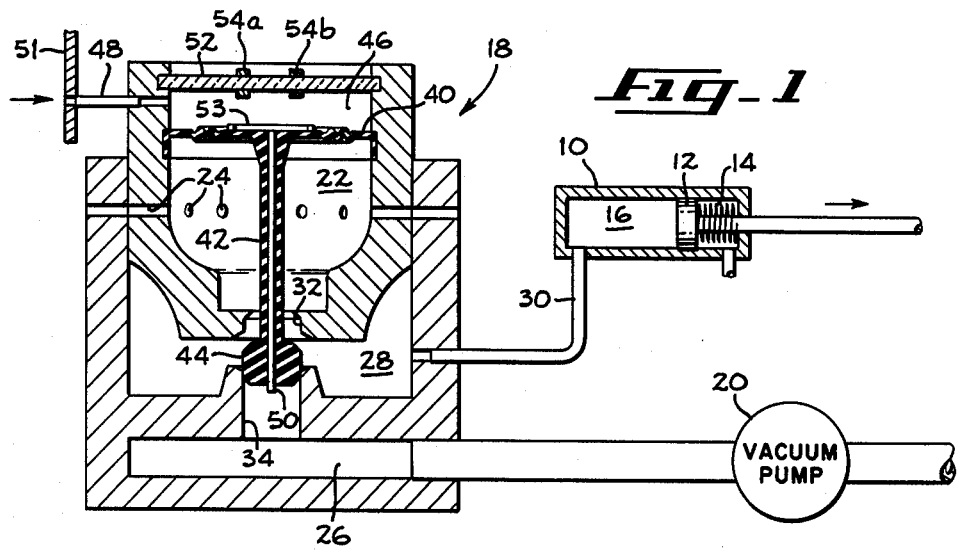
FIG. 1 is a somewhat schematic side elevational view of a section through the valve arrangement of my invention in the position wherein it admits air from the atmosphere into an pneumatic cylinder.
Figure 2:
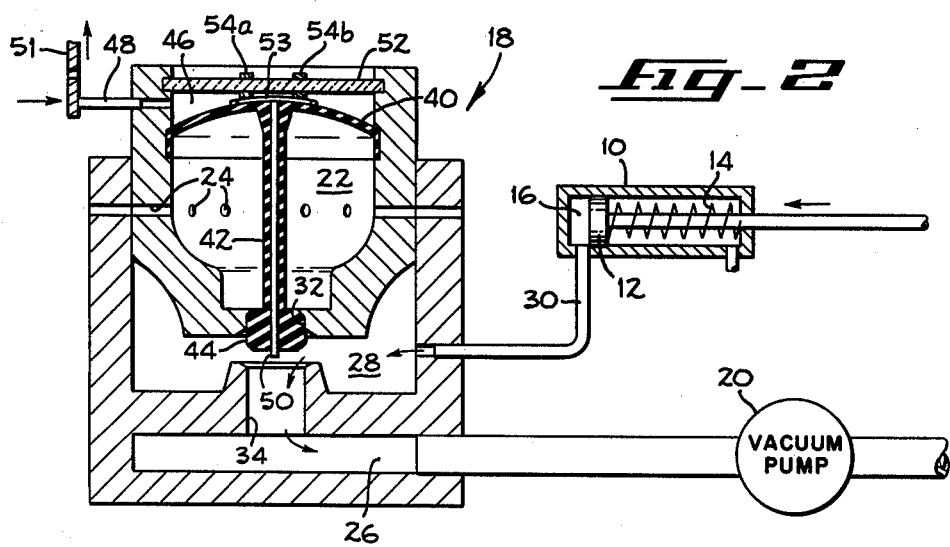
FIG. 2 is a side elevational view similar to FIG. 1 of the valve arrangement in the position wherein it applies a vacuum to the cylinder.

In both FIG. 1 and FIG. 2, the reference number 10 identifies a pneumatic cylinder whose plunger 12 may be urged into projected position by suitable means such as the spring achematically indicated at 14, but is held in retracted position when an adequate vacuum is established in the space 16 between its inner face and the end wall of the cylinder. The control valve arrangement of the invention collectively identified by the reference numeral 18 may be set to connect a source of vacuum 20 to space 16 of the pneumatic cylinder to keep its plunger in retracted condition or it may be set to connect said space to the outside atmosphere and admit air which enables the spring 14 to project the plunger from the cylinder (FIG. 2). For this purpose the valve 18 has an upper chamber 22 to which air is continually admitted through apertures 24 and a bottom chamber 26 which is permanently connected to the source of vacuum 20. Intermediately of chambers 22 and 26. the valve 18 has third chamber 28 from which a conduit 30 leads to space 16 of the pneumatic cylinder 10 and which is in fact therefore the beginning of the conduit 30. Chambers 22 and 26 communicate with the middle chamber or conduit 28 through vertically aligned openings 32 and 34 which are located in the bottom of the upper chamber 22 and the ceiling of the bottom chamber 26, respectively. Means are provided that are selectively operable to either open the upper opening 32 while at the same time closing the lower opening 34 or close the upper opening while at the same time opening the lower opening 34. For this purpose the ceiling 40 of the upper chamber 22 is flexible and attached to it is a stem 42 that is aligned with the center axis of the openings 32 and 34 and which carries a stopper in the form of a cylindrical disk 44 which is adapted to block the openings 32 and 34 depending upon its position vertically of the center axis of the stem 42. When the flexible wall 40 is flat, as shown in FIG. 1, the stopper 44 closes the lower opening 34 but when a vacuum is established above the flexible wall, it arches upwardly as shown in FIG. 2, lifts the stopper 44 into a position wherein it closes the opening 32 in the ceiling of the middle chamber or conduit 28. Arranged above the flexible wall 40 is a control chamber 46 whose internal pressure condition determines the shape of the flexible wall 40. To keep the flexible wall flat, air from the atmosphere is allowed to enter the control chamber 46 through a pipe or tube 48 and thus places it under atmospheric pressure, but when the chamber 46 is evacuated, the diaphragm will arch upwardly and lift the stopper on stem 42 to a level wherein it closes the opening 32 in the bottom of the air admission chamber 22 and opens the opening 34 in the ceiling of the evacuation chamber (FIG. 1). For this purpose a thin channel 50 extends axially through the stem 42 of stopper 44 and diaphragm 40, and applies continually a vacuum to the control chamber 46 since channel 50 is always in communication with the source of vacuum 20. As long as the sensing pipe 48 leading from the outside atmosphere into the control chamber 46 is open, the air entering the control chamber 46 through this pipe overwhelms the evacuating effect of channel 50, because the channel 50 is of a very small diameter as compared with conduit 48, but when conduit 48 is closed such as, for instance, by passage of a solid portion of program tape 51 over its entrance opening, chamber 46 is rapidly evacuated, the diaphragm 40 arches upwardly and lifts the stopper into a position wherein air is cut off from the middle chamber 28 and thus from cylinder 10, and a vacuum is applied to space 16 of cylinder 10 through chambers 26 and 28. On the other hand as soon as the outer end of pipe 48 is reopened, such as when a perforation in a program tape registers with it, the vacuum in control chamber 46 is abolished, the diaphragm 40 straightens out and the stopper 44 drops from opening 32 into opening 34. As a result air reaches space 16 in cylinder 10 through the apertures 24 in the side wall of the upper chamber 22, the upper chamber 22, opening 32 in the floor of the upper chamber, the beginning 28 of conduit 30 and conduit 30 enabling spring means 14 to project the plunger 12 from cylinder 10. Thus, by opening or closing the outer end of pipe 48, the pneumatic cylinder is rapidly and forcefully expanded or contracted as the case may be.

Figure 3:
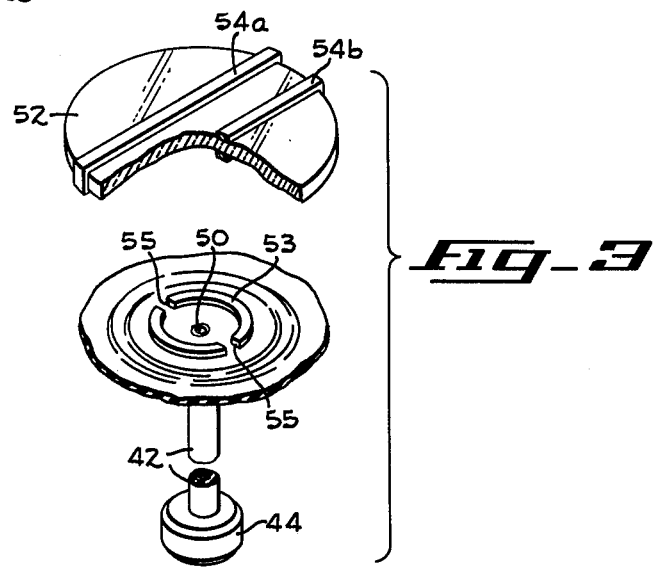
FIG. 3 is a perspective of elements forming part of the valve arrangement of the invention.

The upper end of control chamber 46 may contain, or be formed by a window 52 of transparent plastic material so that an operator is in a position to tell at a glance whether the valve of the invention is operating or not. Moreover a ring 53 of conductive material (FIG. 3) may be arranged upon the upper surface of the diaphragm 40 which operates to connect two electric leads in the form of parallel strips of foil 54a and 54b glued to and around the surface of the window 52 whenever the diaphragm arches upwardly under the effect of a vacuum. This may be used as a switch to indicate visibly or audibly when the valve is in the position wherein it evacuates its respective pneumatic cylinder and causes it to contract or it may be used to actuate mechanisms to supply the correct lengths of wire for whatever operations the controlled cylinders are performing at the moment.

FIG. 1 shows also that the diaphragm 40 is shaped in the manner of a bellows so that it may readily and rapidly be responsive to the described changes in the pressure conditions within control chamber 46. It should also be noted from FIG. 3 that ring 53 should be split and leave gaps 55 so that the evacuating effect of channel 50 is not blocked from the rest of the interior of control chamber 46 when the diaphragm 40 reaches its highest position and the ring strikes fully against inner face of the window 52.

The control valve of my invention lends itself particularly well to association groups, i.e. many of them may be mounted upon and in cooperation with a common elongated source of vacuum to regulate and amplify the action of banks of individual juxtaposed pneumatic actuation elements.

While the valve arrangement of my invention has been described in connection with a pneumatic system, it will be understood that it is equally useful in connection with hydraulic systems.

I claim:

1. A valve arrangement for amplifying the effect of the application of the atmosphere on, or its removal from an air pressure responsive element, such as a bellows or a pneumatic cylinder, comprising in superposition an air admission chamber, an evacuation chamber and intermediately thereof a conduit leading to the air pressure responsive element, said chambers and said conduit having vertically aligned openings establishing communication between said air admission chamber and said conduit and between said evacuation chamber and said conduit, a stopper movable between said openings to close one or the other, and means for actuating said stopper comprising a flexible diaphragm forming the ceiling of said air admission chamber, a stem attached to said diaphragm and mounting said stopper, an air pressure responsive actuating chamber having said diaphragm as its floor and a transparent ceiling, an air admission opening, and a channel leading from said evacuation chamber through said stem to said control chamber, relatively spaced strips of conductive material arranged circumferentially in and around said transparent ceiling and a ring of conductive material arranged upon said diaphragm to act as a switch for activating visible or audible signals whenever said diaphragm reaches its highest position.

2. Arrangement according to claim 1 wherein said ring is split forming gaps that establish communication between the interior of the ring and the rest of the interior of said control chamber.

* * * * *